Feb. 12, 1957 C. A. DOVIDIO 2,781,077
METHOD FOR VACUUM FORMING DUCTILE MATERIAL
Filed Sept. 9, 1953
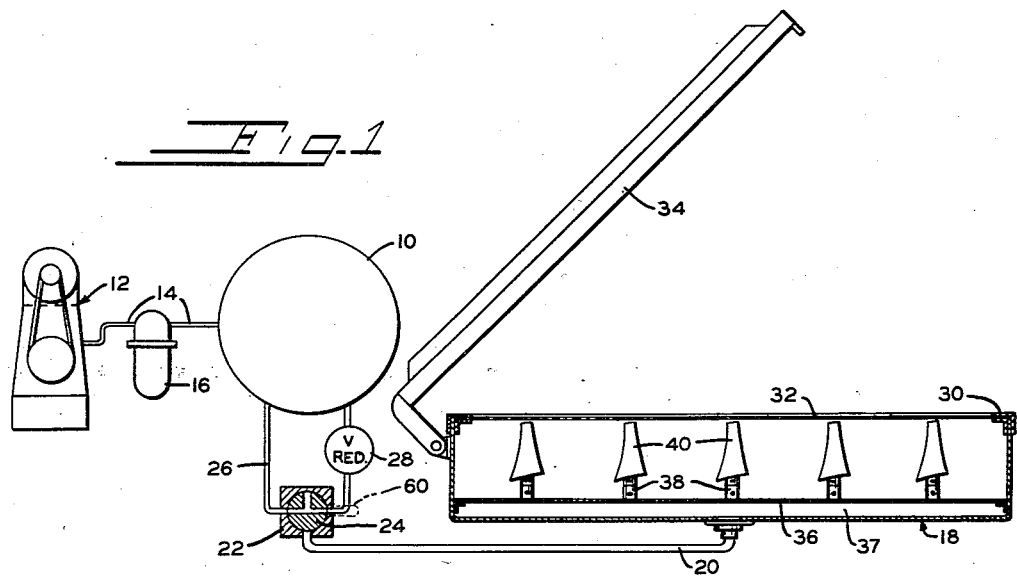
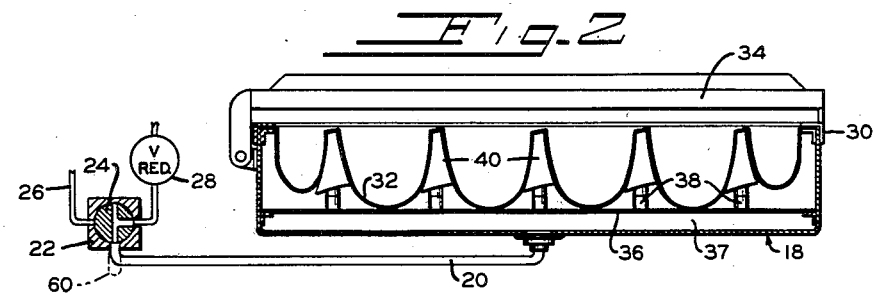
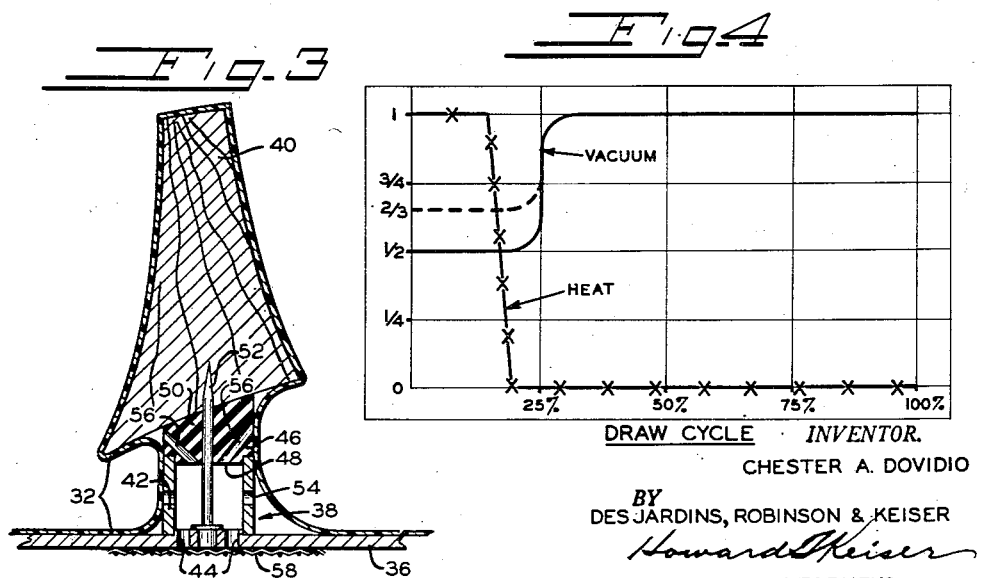
DRAW CYCLE
INVENTOR.
CHESTER A. DOVIDIO
BY
DESJARDINS, ROBINSON & KEISER
HIS ATTORNEYS United States Patent Office 2,781,077
Patented Feb. 12, 1957

2,781,077
METHOD FOR VACUUM FORMING DUCTILE MATERIAL

Chester A. Dovidio, Leominster, Mass., assignor to Nixon Nitration Works, Nixon, N. J., a corporation of New Jersey Application September 9, 1953, Serial No. 379,256

7 Claims. (Cl. 154—41)

This invention relates to a method for vacuum forming sheets of ductile material, and more particularly, to a novel procedure of vacuum forming the pliable sheet material about the mold or the articles to be covered.

Vacuum forming of plastic sheet material is today, of course, a well known procedure in the plastic molding industry. According to this method, the shaping mold, which may be formed of metal, plaster, sprayed metal, or any other rigid material, is placed in the bottom of a die box and a sheet of thermoplastic material is then placed over the top of the box and tightly clamped in place so as to form an air-tight seal between the sheet and the box. The sheet is softened and rendered pliable either by soaking the sheet in acetone, or a mixture of acetone and alcohol, before it is clamped in the pressure frame, or by applying heat to the sheet after it is clamped over the die box. The heating of the sheet is ordinarily accomplished by moving a flat plate heated to a temperature of from 500 to 700° F. over the plastic sheet so as to soften the material and render it pliable. A vacuum is then applied to the die box by means of a vacuum line connected to the bottom of the box. The mold is perforated with many tiny holes so that the softened sheet will be drawn down into intimate contact with the contoured face of the mold. The heater is then removed and the vacuum turned off after which the formed plastic sheet is removed from the mold, usually by blowing it out with compressed air.

This method is well suited to the forming of comparatively flat articles over plaster or sprayed metal molds. It has not, so far as I am aware, been applied to the covering of articles with a layer of plastic material which forms part of the subject matter of the present invention.

In accordance with my novel process, the article to be covered replaces the mold in the conventional vacuum forming process. However, since it is neither feasible nor desirable to perforate the article to be covered with the customary suction holes, different means must be provided for drawing the pliable plastic material down about the article. The plastic covering may be adhered to the article by any desired type of adhesive which may be applied to the article before it is placed in the die box at the outset of the operation.

In applying the vacuum forming process to the covering of articles with plastic sheet material, it has been found that the process works satisfactorily except when deep draws are encountered in which case the extreme stretching of the plastic sheet material over the article causes an undesirable variation in the final thickness of the plastic covering. For example, in covering heels for ladies' shoes with .010 inch thermoplastic sheet stock, in the case of high heels, i. e., 22/8 heels, the thickness of the plastic covering will range from .005 inch at places where the stretch is greatest, to a full .010 inch at places where little or no stretch occurs. This represents a 100% variation in thickness which, of course, is undesirable since the cover is greatly weakened and is rendered susceptible to cracking or splitting at the places where it has been pulled thin. It is one of the purposes of my invention, therefore, to minimize this stretching of the sheet material and provide a covering of substantially uniform thickness throughout. I have found that this can be done by applying a reduced vacuum to the die box at the outset of the operation. After the plastic sheet has commenced to drape over the articles in the die box, the heater is removed and the vacuum is increased to its full value for the remainder of the vacuum forming operation. The softer pull of the vacuum while the sheet is in a highly pliable state, prevents undue stretching and thinning out of the sheet at places where the pull is the greatest. At the same time, the vacuum is sufficient to cause the plastic to drape over and around the articles reposing in the die box so that when the heat is removed and the vacuum increased to its maximum value, there will be very little stretching of the material in the final drawing of the sheet about the articles. Also, the cooling of the sheet will render it less pliable and better able to withstand the harder pull exerted by the increased vacuum without any undue elongation.

By use of my improved method, the variation in the thickness of the plastic cover may be held within a few thousandths of an inch. That is, for relatively thin stock such as .010 inch cellulose nitrate sheet, the variation on 22/8 heels will not exceed .003 inch. In other words, the thinnest portion of the cover will be not less than .007 inch thick which represents a 43% variation in the thickness of the sheet with my improved drape-forming process. This improved method may, of course, be applied with equally beneficial results to the vacuum forming of sheet material in molds having unusually deep draws which would cause excessive thinning out of the sheet stock to occur if the conventional vacuum forming method were employed.

Accordingly, it is an object of my invention to provide a new and improved method of vacuum forming thermoplastic sheet stock over molds or articles to be covered with ductile material where deep draws are encountered.

Another object of my invention is to provide a new and improved method of covering articles with a layer of ductile material.

Another object of my invention is to provide a novel method of simultaneously covering a plurality of heels for ladies' shoes with plastic sheet stock.

Another object of my invention is to provide novel apparatus for use in connection with my improved method.

With these and other objects in view, which will become apparent from the following description, the invention includes certain other novel features the essential elements of which are set forth in the appended claims and a preferred form or embodiment of which will be hereinafter described with reference to the drawings which accompany and form a part of this specification.

In the drawings:

Fig. 1 is a schematic view of one possible form of apparatus which may be used in practicing my novel vacuum forming method.

Fig. 2 is a view similar to Fig. 1 but showing the condition of the plastic sheet after it has been softened by heat and has commenced to drape over the articles or dies in the die box under the influence of a partial vacuum.

Fig. 3 is an enlarged view of one of the wood heels appearing in the preceding figures showing the details of one of the vacuum nozzles on which each of the heels is mounted.

Fig. 4 is a graph showing the approximate time in the draw cycle when the heater is removed and the vacuum increased to its maximum value.

In Fig. 1 of the drawings I have shown a schematic representation of a vacuum forming apparatus which may be utilized in carrying out my invention. As herein shown, a vacuum tank 10 is evacuated and maintained at a predetermined reduced pressure by means of a vacuum pump 12 which is connected with the tank 10 by a line 14 and a suitable moisture trap 16. A die box 18 of conventional design is connected with the vacuum tank 10 by a vacuum line 20 attached in the usual manner to the bottom of the die box. The line 20 is connected with a port on a selector valve 22 provided with a rotatable core 24 which is ported in the manner indicated in Figs. 1 and 2. A second port on the valve 22 is connected by a line 26 directly to the vacuum tank 10. A third port on the valve 22 is connected through a reducing valve 28 with the tank 10 for a purpose presently to be explained.

The die box 18 is provided with the customary hinged clamping frame 30 which serves to hold a sheet of thermoplastic material 32 in air-tight engagement with the top of the die box. A radiant type heater 34 is hinged at one end on the die box 18 so that the heater may be swung up out of heating position as shown in Fig. 1 or down into position over the thermoplastic sheet as shown in Fig. 2 where it will be effective to heat and soften the material.

Seated in the bottom of the die box 18 is a removable die plate 36 on which are supported a plurality of vacuum nozzles 38 on which are mounted the wood heels 40 to be covered with the thermoplastic material 32. The constructional details of the vacuum nozzles 38 may be better understood by referring to Fig. 3 where they are shown on an enlarged scale. As therein shown each nozzle comprises a short section of tubing 42 mounted in an upright position on the die plate 36 to which it may be secured by brazing or welding. The die plate 36 is made for a snug fit within the die box in order to effect a seal between the edges of the plate and the box. Hence, when a vacuum is applied to the box through the line 20, the space between the bottom wall of the die box and the die plate 36 will be evacuated, this space being indicated by reference numeral 37 in Figs. 1 and 2. The interior of each tube section 42 is communicatively connected with the space 37 by a series of small holes or apertures 44 provided in the die plate 36 interiorly of the walls of the tube sections 42. Each tube section 42 is closed at its upper end by a plug 46 which is formed on its lower end with a short tenon 48 which is received within the upper end of the tube. The plugs 46 may be made of hard rubber, plastic, metal, or other suitable material, and have their top surfaces shaped to provide a seat 50 which conforms to the shape of the top of the heel 40. The heels are maintained in place on the seats 50 by means of spikes 52 which are secured in the die plate 36 and project up through the center of each tube 42 and plug 46. Hence, the heels 40 may be fastened in place on the nozzle 38 by driving them onto the pointed ends of the spikes 52 in the manner indicated in Fig. 3.

For the purpose of drawing the thermoplastic sheet material in around the edges of the heel top, orifices 54 are provided in the sides of the tubes 42 and vacuum ducts 56 are provided in the plug 46 for producing a vacuum on the surface of the heel adjacent the seat 50 on the plug. A conventional vacuum distributing screen 58 (Fig. 3) may be provided in the die box 18 beneath the removable die plate 36 in accordance with conventional practice.

The novel method which I employ to cause the thermoplastic material 32 to be drawn down over the wood heels 40 and into intimate contact with the surfaces thereof is as follows:

The wood heels 40 are first prepared for the covering operation by dipping or spraying the heels with a suitable adhesive or cement which will bond the plastic covering material securely to the surface of the heel. This bonding agent is preferably a reactivating type of cement which will be softened upon contact with the heated plastic sheet and cause the interior face of the sheet to be firmly adhered to the surface of the heel. If the thermoplastic sheet stock chosen for the covering material is cellulose nitrate, a reactivating cement with a nitrocellulose base will constitute a satisfactory bonding agent which may be sprayed on the heels and allowed to dry before the heels are mounted on the die plate. The heels are mounted on the vacuum nozzles on the die plate 36 by tapping them down on the spikes 52 (Fig. 3) and, when a heel has been secured on each nozzle 38, the die plate 36 is placed in the die box 18 as shown in Fig. 1. Then the thermoplastic sheet stock to be used in the covering operation, for example nitrocellulose sheet .010 inch thick, is clamped in place in the clamping frame 30 above the heels 40. The heater 34 which is maintained at a temperature of from 500° F. to 700° F. is then lowered into operative position above the sheet stock in order to preheat the thermoplastic sheet before the draw cycle commences. After the heater has been maintained in place over the sheet long enough for the latter to soften and become plastic, the draw cycle is commenced by applying a partial vacuum to the bottom of the die box through the vacuum line 20. This is accomplished by turning the valve body 24 clockwise from the off position shown in Fig. 1 to the partial vacuum position shown in Fig. 2, the valve being operated by means of a suitable handle 60. With the valve body in this position, the vacuum line 20 will be connected with the vacuum tank 10 through the reducing valve 28. Accordingly, a reduced vacuum will be applied to the lower portion of the die box at the outset of the drawing operation. As shown by the graph in Fig. 4, this partial vacuum may, for example, be ½ of the full vacuum when the valve 22 is the Fig. 2 position. This is assuming a full vacuum of approximately 12 pounds per square inch negative pressure so that the initial vacuum applied to the box would be 6 pounds per square inch negative pressure. This will be found suitable in cases where exceptionally deep draws are required, for example, when heels of 22/8 are being covered, or the plastic sheet is being formed in a mold having draws of equivalent depth. When lower heels such as 18/8 are to be covered, or the sheet is to be formed in a mold having draws of equivalent depth, suitable results may be obtained by using a starting vacuum of ⅔ maximum or approximately 8 pounds per square inch negative pressure.

The vacuum applied to the die box through the line 20 is increased to a maximum, i. e., 12 pounds per square inch negative pressure, at approximately the same time or just after the heater 34 is raised to its ineffective position. This is indicated in the graph in Fig. 4 where the line x—x represents movement of the heater from its lowered or effective position which it occupies at the beginning of the draw cycle, to its raised or ineffective position where it remains until the end of the draw cycle, i. e., until the vacuum is turned off. The removal of the heater from over the die box and the increase of the vacuum to its maximum value should preferably occur somewhere in the first 10% to 30% of the draw cycle. The vacuum on the die box may be increased to its full value by giving the valve body 24 a half counterclockwise turn by the handle 60 so that the line 26 will be communicatively connected with the vacuum line 20. At the end of the draw cycle, after the drawing operation has been completed, the vacuum may be turned off by giving the handle 60 one quarter turn clockwise which will bring it back to its initial position shown in Fig. 1.

While this process has been found to have particular advantage in the covering of wood heels for ladies shoes with a thermoplastic resin such as cellulose nitrate, it is by no means restricted to this particular application but is useful in covering all sorts of objects with a layer of plastic, and may also be applied with beneficial results in the vacuum forming of plastic sheet material in molds where the draws are sufficiently deep to result in excessive variations in the thickness of the sheet when the ordinary vacuum forming process is used.

Accordingly, while I have described my invention in connection with one possible form or embodiment thereof, it is to be understood that the present disclosure is illustrative rather than restrictive and that changes and modifications may be resorted to without departing from the spirit or scope of the claims which follow.

Having thus described my invention, what I claim as new and useful and desire to secure by United States Letters Patent is:

1. The method of forming a sheet of plastic material about a contoured object which comprises placing the object in an enclosure, covering the enclosure with a temporarily softened sheet of the plastic material so as to render the enclosure air-tight, applying a reduced vacuum of predetermined value to the inside of the enclosure through the bottom thereof so as to pull the pliable sheet material down into contact with the object, and thereafter increasing the vacuum to a predetermined maximum as the sheet becomes less pliable so as to draw the material snugly into contact with the surface of the object.

2. The method of forming a sheet of thermoplastic material about a contoured object which comprises placing the object in an enclosure, covering the enclosure with a sheet of the thermoplastic material so as to render the enclosure substantially air-tight, applying heat to the thermoplastic material to soften the same, removing air from the inside of said enclosure through the bottom thereof after the material has been softened so as to cause the thermoplastic sheet to move down into contact with the object therein, and then discontinuing the application of heat to the thermoplastic sheet and removing additional air from within the enclosure to form the sheet snugly about the object.

3. The method of claim 2 including the step of coating with an adhesive all of the surfaces of the object which are to be covered by the sheet of thermoplastic material before placing the object in the enclosure so as to cause the material to be adhered to the object at the conclusion of the forming operation.

4. The method of forming a sheet of thermoplastic material about a contoured object which comprises placing the object in an enclosure, covering the enclosure with a sheet of the thermoplastic material so as to render the enclosure substantially air-tight, applying heat to the thermoplastic material to soften the same, then applying reduced vacuum to the inside of the enclosure through the bottom thereof while still applying heat to the thermoplastic sheet so as to draw the sheet down into contact with the object situated therein, discontinuing the application of heat to the thermoplastic sheet, and thereafter applying full vacuum to the enclosure for the remainder of the drawing operation.

5. The method of claim 4 in which heating is discontinued and full vacuum is applied after the drawing operation is 10% to 30% complete.

6. The method of simultaneously covering a plurality of contoured articles with a layer of thermoplastic sheet material which comprises placing the articles inside a die box, covering the box with a sheet of thermoplastic material, heating the sheet of thermoplastic material to render it pliable, evacuating air from the die box while applying heat to the sheet so as to produce a vacuum in the die box of approximately 6-8 pounds per square inch negative pressure and cause the softened sheet to drape down over the articles contained in the box, and thereafter removing the heat from the plastic sheet and evacuating additional air from the die box so as to increase the vacuum therein to approximately 12 pounds per square inch negative pressure so as to cause the sheet to be drawn snugly around the articles contained in the die box.

7. The method of claim 6 wherein each of the articles to be covered with the thermoplastic sheet material is first coated with an adhesive before drawing the plastic sheet material thereover so as to cause the sheet material to be adhered to the articles at the conclusion of the drawing operation.

References Cited in the file of this patent

UNITED STATES PATENTS

| | | |
|---|---|---|
| 1,980,022 | Whitehouse | Nov. 6, 1934 |
| 2,088,352 | Vierkotter | July 27, 1937 |
| 2,155,445 | Pittenger | Apr. 25, 1939 |
| 2,236,552 | Ushakoff | Apr. 1, 1941 |
| 2,363,431 | Moorhouse | Nov. 21, 1944 |
| 2,576,121 | Kamborian | Nov. 27, 1951 |
| 2,618,310 | Kerr | Nov. 18, 1952 |
| 2,647,556 | Courtney | Aug. 4, 1953 |
| 2,661,789 | Keller | Dec. 8, 1953 |

FOREIGN PATENTS

| | | |
|---|---|---|
| 443,696 | Great Britain | Mar. 4, 1936 |